(12) United States Patent
Yano et al.

(10) Patent No.: US 11,518,213 B2
(45) Date of Patent: Dec. 6, 2022

(54) AIR-CONDITIONING APPARATUS FOR VEHICLE AND CONTROL METHOD OF THE SAME

(71) Applicant: MAZDA MOTOR CORPORATION, Hiroshima (JP)

(72) Inventors: Teruaki Yano, Hiroshima (JP); Masaru Terada, Hiroshima (JP); Yuya Taketa, Hiroshima (JP); Yoshihiro Koga, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 145 days.

(21) Appl. No.: 17/048,501

(22) PCT Filed: Apr. 9, 2019

(86) PCT No.: PCT/JP2019/015482
§ 371 (c)(1),
(2) Date: Oct. 16, 2020

(87) PCT Pub. No.: WO2019/208208
PCT Pub. Date: Oct. 31, 2019

(65) Prior Publication Data
US 2021/0170829 A1    Jun. 10, 2021

(30) Foreign Application Priority Data
Apr. 24, 2018   (JP) .............................. JP2018-082692

(51) Int. Cl.
*B60H 1/00*    (2006.01)
(52) U.S. Cl.
CPC ..... *B60H 1/00735* (2013.01); *B60H 1/00849* (2013.01)

(58) Field of Classification Search
CPC ............ B60H 1/00735; B60H 1/00849; B60H 1/00828
(Continued)

(56) References Cited

U.S. PATENT DOCUMENTS

| 2014/0273786 | A1* | 9/2014 | Wade | B60H 1/00735 454/75 |
| 2015/0345810 | A1* | 12/2015 | Jones | B60H 1/00678 454/333 |
| 2017/0267067 | A1* | 9/2017 | Cosgrove | B60H 1/00778 |

FOREIGN PATENT DOCUMENTS

| JP | H03-072007 U | 7/1991 |
| JP | H06-032121 U | 4/1994 |

(Continued)

OTHER PUBLICATIONS

International Search Report issued in PCT/JP2019/015482; dated Jun. 11, 2019.

*Primary Examiner* — Ko-Wei Lin
(74) *Attorney, Agent, or Firm* — Studebaker & Brackett PC

(57) ABSTRACT

An air-conditioning apparatus for a vehicle and a control method of the same are provided which may inhibit a closing degree of a door from being insufficient even when the door is closed while a blower fan is actuated. An air-conditioning apparatus for a vehicle includes an inside-outside air switching damper including a damper switching actuator, a blower fan, a control unit, and door opening-and-closing sensors. In a case where the door becomes an open state and a case where the blower fan is actuated and the inside-outside air switching damper is in an outside air introduction mode, the control unit issues a command to the damper switching actuator to switch the inside-outside air switching damper to an inside air circulation mode.

5 Claims, 10 Drawing Sheets

(58) Field of Classification Search
USPC .................................................. 454/70, 75
See application file for complete search history.

(56) References Cited

FOREIGN PATENT DOCUMENTS

JP       H10-315743  A    12/1998
JP       2015-039995  A    3/2015

* cited by examiner (a)

(b)

AIR-CONDITIONING APPARATUS FOR VEHICLE AND CONTROL METHOD OF THE SAME

TECHNICAL FIELD

The present invention relates to an air-conditioning apparatus for a vehicle and a control method of the same.

BACKGROUND ART

A vehicle includes an air-conditioning apparatus for a vehicle for controlling an environment such as a temperature in a vehicle cabin. The air-conditioning apparatus for a vehicle has an inside-outside air switching damper for switching between an outside air introduction mode and an inside air circulation mode. When an occupant selects the outside air introduction mode by an air-conditioning control switch provided in the vehicle cabin, the posture of a valve body is set such that the inside-outside air switching damper may introduce outside air into the vehicle cabin. When the inside air circulation mode is selected, the posture of the valve body is set such that inside air is introduced and circulated in the vehicle cabin.

Incidentally, in recent years, airtightness of a vehicle cabin tends to be further enhanced. In a vehicle in which the airtightness of the vehicle cabin is enhanced as described above, when a door is closed, an amount of air escaping from a door opening decreases due to a decrease in an opening area of the door, and the amount of air escaping through gaps in a vehicle body other than the door opening is very little. Thus, it becomes difficult for the door to be closed. As a result, a door-ajar state may occur.

Patent Literature 1 discloses a technique for inhibiting occurrence of such a door-ajar state in a case where a door is closed. In the technique disclosed in Patent Literature 1, as for the posture of a valve body of an inside-outside air switching damper, a configuration is provided in which an intermediate state may be set where the valve body may take an intermediate posture between a posture for outside air introduction and a posture for inside air circulation. Further, the technique disclosed in Patent Literature 1 employs a configuration in which the inside-outside air switching damper is caused to become the above intermediate state in a case where the door of a vehicle is opened and the posture of the valve body may be returned to an immediately previous state to opening of the door after the door is closed.

However, in the technique disclosed in above Patent Literature 1, there is a concern that in a case where a blower fan is actuated which sends air taken in by the inside-outside air switching damper into a vehicle cabin, it becomes difficult to prevent occurrence of the door-ajar state. That is, in the technique disclosed in above Patent Literature 1, because the inside-outside air switching damper is set to the intermediate state in the time from opening to closing of the door, outside air is taken into the vehicle cabin due to actuation of the blower fan.

Thus, in the technique disclosed in above Patent Literature 1, when an occupant attempts to close the door, a pressure in the vehicle cabin becomes higher than the outside of the vehicle cabin, and the door-ajar state is likely to occur.

CITATION LIST

Patent Literature

Patent Literature 1: Japanese Patent Laid-Open No. 2015-39995

SUMMARY OF INVENTION

The present invention has been made for solving an above problem, and an object thereof is to provide an air-conditioning apparatus for a vehicle and a control method of the same that may inhibit a closing degree of a door from being insufficient even when the door is closed while a blower fan is actuated.

An air-conditioning apparatus for a vehicle according to one aspect of the present invention includes: an inside-outside air switching unit capable of switching between an outside air introduction mode for introducing air from an outside of a vehicle cabin of the vehicle and an inside air circulation mode for causing air in the vehicle cabin of the vehicle to circulate; a blower fan blowing air taken in by the inside-outside air switching unit into the vehicle cabin; a door opening-and-closing detection unit detecting an open-or-closed state of a door of the vehicle; and an air-conditioning controller accepting information about detection from the door opening-and-closing detection unit, information about a mode being executed by the inside-outside air switching unit, and information about whether or not the blower fan is actuated, the air-conditioning controller issuing a command of a mode to be executed to the inside-outside air switching unit, in which the air-conditioning controller issues a command to the inside-outside air switching unit to perform switching to the inside air circulation mode in a case where a determination is made that the door opening-and-closing detection unit detects an open state of the door, the inside-outside air switching unit executes the outside air introduction mode, and the blower fan is actuated.

Note that "blow" herein means blowing air out.

BRIEF DESCRIPTION OF DRAWINGS

FIG. 10 is a schematic side view illustrating a state of an inside-outside air switching damper according to a modification of the present invention, in which FIG. 10(a) illustrates a state of the inside-outside air switching damper in a second intermediate mode and FIG. 10(b) illustrates a state of the inside-outside air switching damper in a third intermediate mode.

DESCRIPTION OF EMBODIMENT

Figure 1:
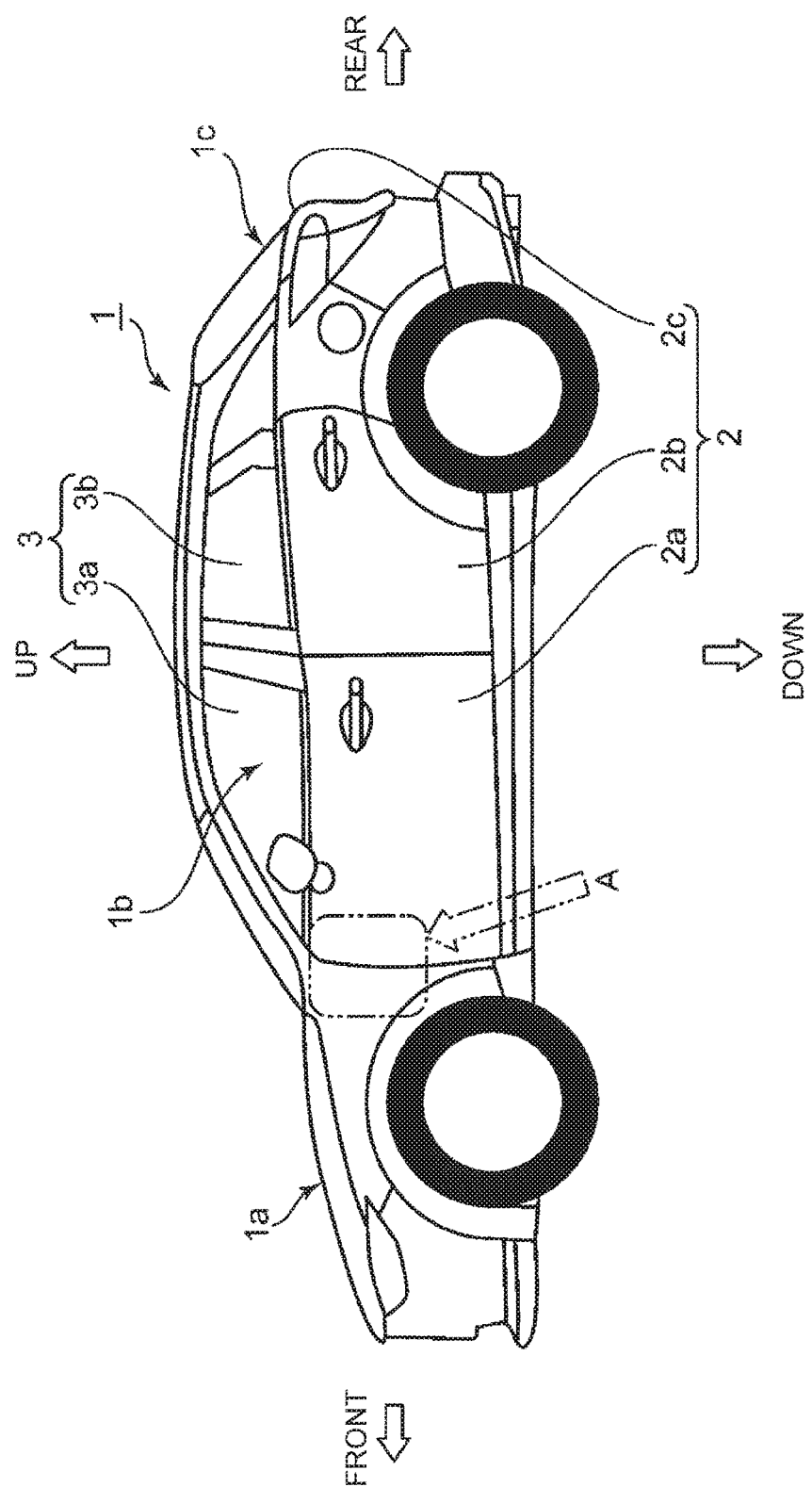
FIG. 1 is a schematic side view of a vehicle according to an embodiment of the present invention as seen from a left side.

An embodiment of the present invention will hereinafter be described with reference to drawings. Note that the embodiment described in the following is one aspect of the present invention, and the present invention is not limited to the following embodiment at all except inherent configurations of the present invention.

Note that in the drawings used in the following descriptions, "front", "rear", "up", "down", "right", and "left" are directions with respect to an occupant riding a vehicle as a reference.

1. Configuration of Vehicle 1

A configuration of a vehicle 1 according to this embodiment will be described by using FIG. 1.

As illustrated in FIG. 1, the vehicle 1 is configured with a vehicle front portion 1a on which a driving motive power source such as an engine and so forth are mounted, a vehicle cabin portion 1b in which the occupant rides, and a vehicle rear portion 1c in the rear of the vehicle cabin portion 1b. The vehicle cabin portion 1b of the vehicle 1 is provided with doors 2 (front doors 2a, rear doors 2b, and a rear gate 2c) opened and closed when the occupant gets on and off the vehicle 1 and baggage is put in and out.

Note that although FIG. 1 illustrates only a left side surface of the vehicle 1, the front door 2a and the rear door 2b are also provided to a right side surface on the opposite side.

Windows 3 (front windows 3a and rear windows 3b) opened and closed by operations by the occupant are respectively provided to the front doors 2a and the rear doors 2b.

2. Inside-Outside Air Switching Damper 4

Figure 2:
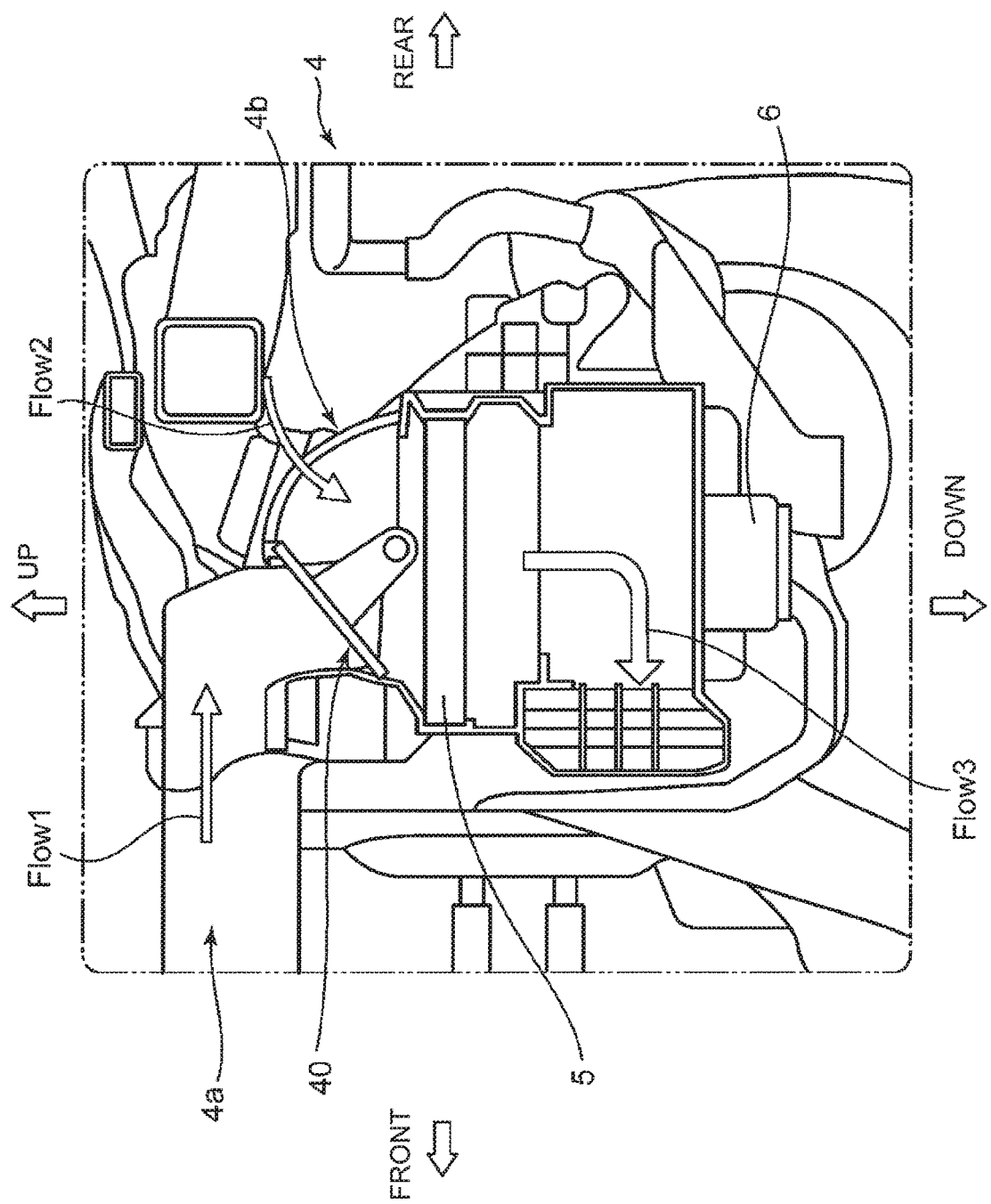
FIG. 2 is a schematic side view illustrating an A part in FIG. 1.
Figure 3:
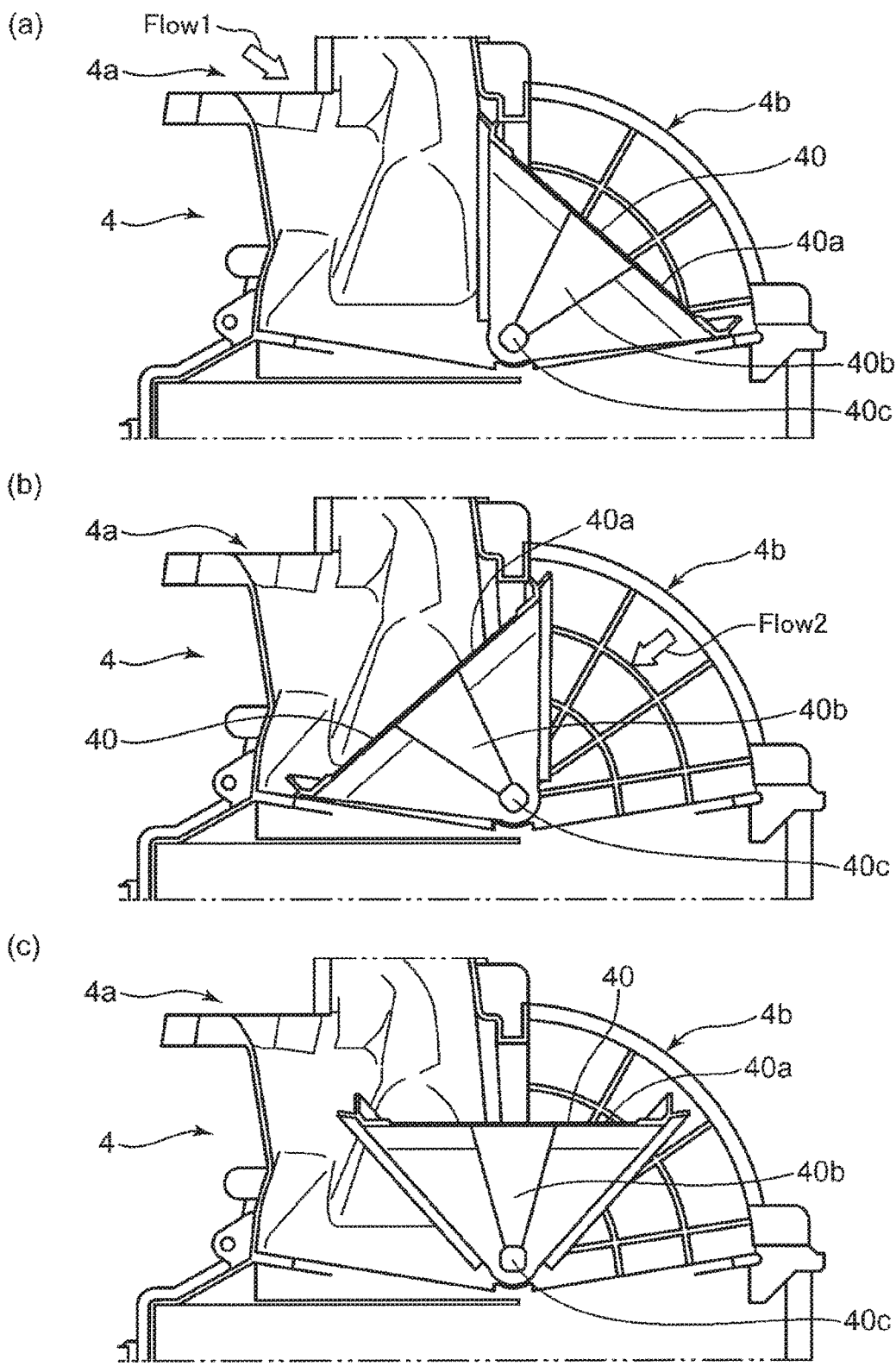
FIG. 3(a) is a schematic side view illustrating a state of an inside-outside air switching damper in an outside air introduction mode.
FIG. 3(b) is a schematic side view illustrating a state of the inside-outside air switching damper in an inside air circulation mode.
FIG. 3(c) is a schematic side view illustrating a state of the inside-outside air switching damper in an intermediate mode.

A configuration of an inside-outside air switching damper 4 provided to the vehicle 1 will be described by using FIG. 2 and FIG. 3. FIG. 2 is a schematic side view illustrating a configuration of the inside-outside air switching damper 4 mounted on an A part in FIG. 1. In FIG. 3, FIG. 3(a) is a schematic side view illustrating a state of the inside-outside air switching damper 4 in a case where an outside air introduction mode is selected, FIG. 3(b) is a schematic side view illustrating a state of the inside-outside air switching damper 4 in a case where an inside air circulation mode is selected, and FIG. 3(c) is a schematic side view illustrating a state of the inside-outside air switching damper 4 in a case where an intermediate mode is selected.

As illustrated in FIG. 2, the inside-outside air switching damper 4 includes an outside air introduction port 4a for taking in air from the outside (front) of the vehicle 1 and an inside air introduction port 4b for taking in air from an inside portion of the vehicle cabin portion 1b.

The inside-outside air switching damper 4 includes a valve body 40 in a merging portion of a path continuous with the outside air introduction port 4a and a path continuous with the inside air introduction port 4b. As illustrated in FIG. 3(a) to FIG. 3(c), the valve body 40 has a plate-like body 40a and a support arm 40b provided below that. The plate-like body 40a and the support arm 40b are capable of integrally rotating around a support shaft 40c as a rotation center, the support shaft 40c supporting a lower portion of the support arm 40b.

Referring to FIG. 2 again, a filter 5 and a blower fan 6 are attached to a lower side of the inside-outside air switching damper 4. During actuation of the blower fan 6, outside air Flow1 as air of an outside portion of the vehicle or inside air Flow2 as air of an inside portion of a vehicle cabin portion 1b is introduced into the inside-outside air switching damper 4 in accordance with a state of the valve body 40. Then, the introduced outside air Flow1 or inside air Flow2 is subjected to air conditioning via an A/C (air conditioner) (not illustrated) including the filter 5 and an evaporator and so forth and is thereafter blown into the vehicle cabin portion 1b as conditioned air Flow3.

As illustrated in FIG. 3(a), in a case where the outside air introduction mode is selected, the plate-like body 40a of the valve body 40 takes a posture to block the inside air introduction port 4b. Accordingly, in a case where the outside air introduction mode is selected, only the outside air Flow1 is introduced into the inside-outside air switching damper 4 through the outside air introduction port 4a.

Next, as illustrated in FIG. 3(b), in a case where the inside air circulation mode is selected, the plate-like body 40a of the valve body 40 takes a posture to block the outside air introduction port 4a. Accordingly, in a case where the inside air circulation mode is selected, only the inside air Flow2 is introduced into the inside-outside air switching damper 4 through the inside air introduction port 4b.

Next, as illustrated in FIG. 3(c), in a case where the inside-outside air switching damper 4 is set to the intermediate mode, the plate-like body 40a of the valve body 40 takes a posture in an intermediate position between the posture in the outside air introduction mode and the posture in the inside air circulation mode. Accordingly, the outside air introduction port 4a and the inside air introduction port 4b become a communicating state. Thus, a flow path of air is formed between a space of the vehicle cabin portion 1b and the outside of the vehicle cabin.

Switching between the outside air introduction mode and the inside air circulation mode among three modes to which the inside-outside air switching damper 4 may be set is executed by an operation by the occupant for an air-conditioning control switch 8 provided in the vehicle cabin portion 1b. This will be described later.

3. Opening and Closing of Doors in Vehicle 1

Figure 4:
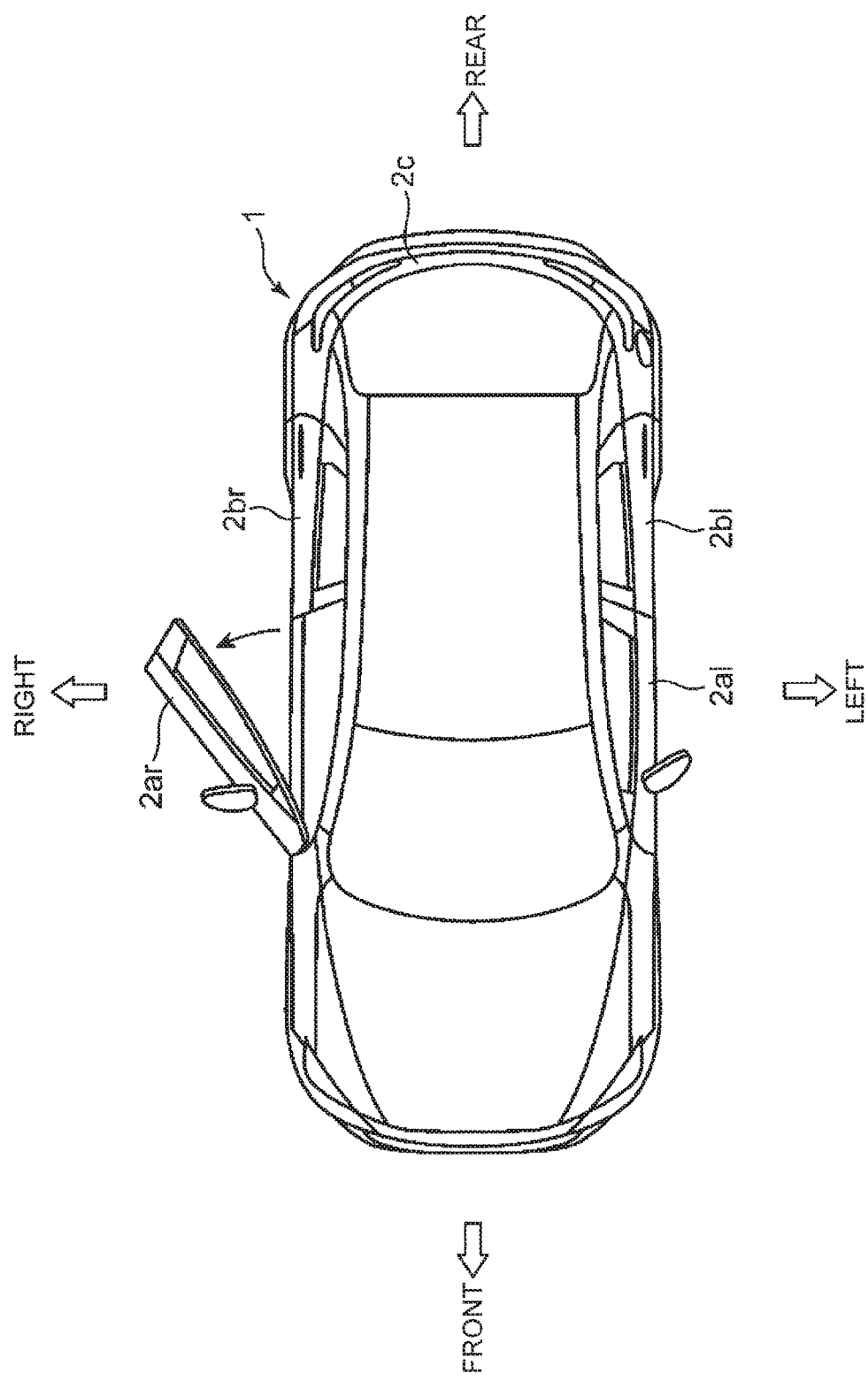
FIG. 4 is a schematic plan view illustrating the vehicle in which a door on a driver seat side is in an open state.

Opening and closing of the doors 2 in the vehicle 1 will be described by using FIG. 4. FIG. 4 is a schematic plan view illustrating a state of the vehicle 1 in which a door 2ar on a driver seat side is in an open state.

As illustrated in FIG. 4, in the vehicle 1, doors 2ar, 2al, 2br, and 2bl are opened and closed when occupants get on and off the vehicle 1. Further, when baggage is put in and out with respect to the vehicle 1, the rear gate 2c is opened and closed.

Here, in a case where plural occupants get on and off the vehicle 1 or a case where the occupant puts in and out the baggage placed in a rear portion of the vehicle cabin portion 1b, the doors 2ar, 2al, 2br, and 2bl and the rear gate 2c may be opened and closed with time gaps (that is, at different timings).

Note that in the vehicle 1 according to this embodiment, a door opening-and-closing sensor is provided to a support portion of each of the doors 2ar, 2al, 2br, and 2bl and the rear gate 2c.

4. Configuration of Air-Conditioning Control Switch 8

Figure 5:
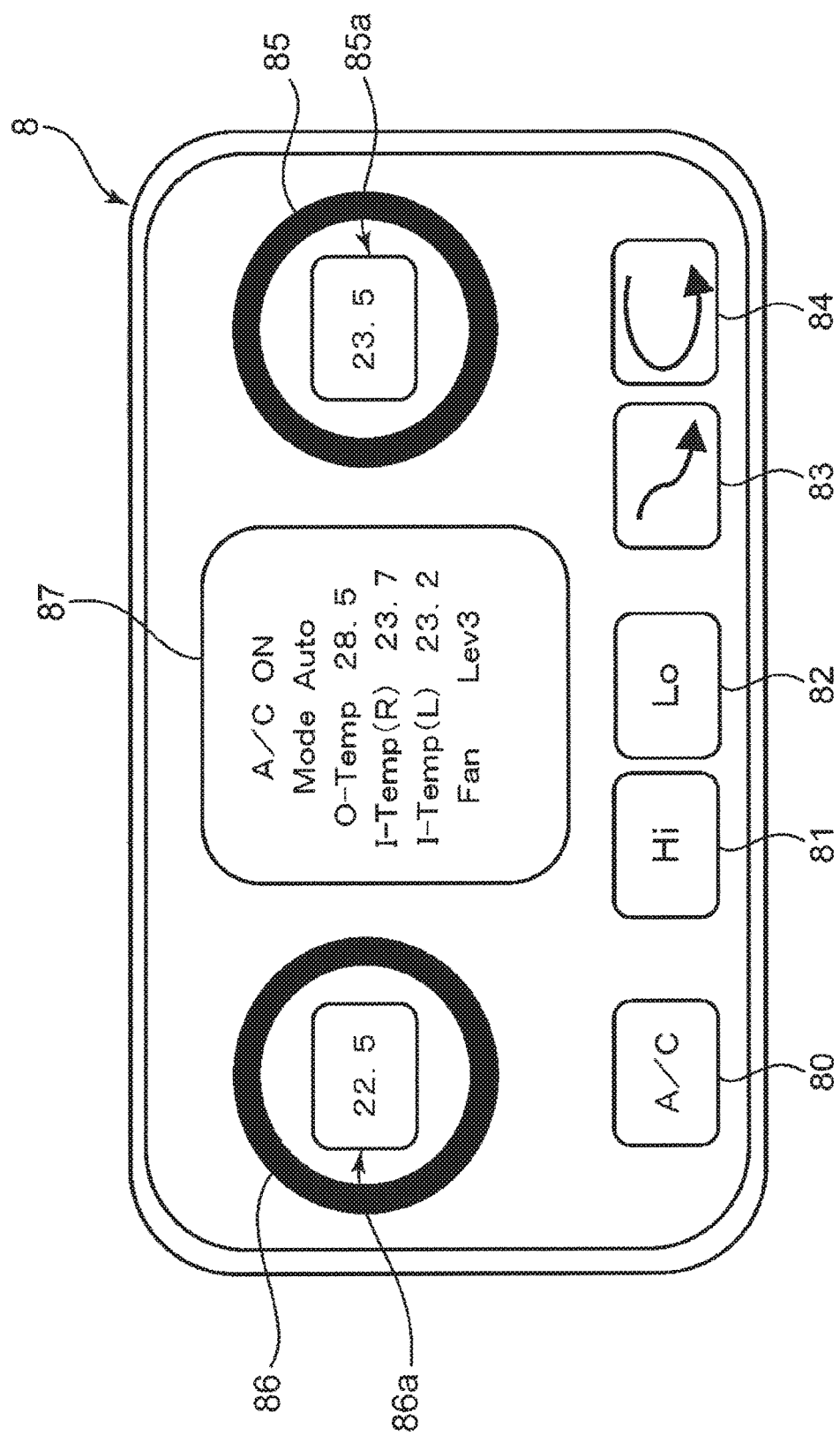
FIG. 5 is a schematic diagram illustrating a configuration of an air-conditioning control switch provided in an inside portion of a vehicle cabin.

A description will be made about a configuration of the air-conditioning control switch 8 provided to a dashboard in the vehicle cabin portion 1b by using FIG. 5. FIG. 5 is a schematic diagram illustrating the configuration of the air-conditioning control switch 8.

As illustrated in FIG. 5, the air-conditioning control switch 8 includes an A/C (air conditioner) switch 80, airflow amount switches 81 and 82, an outside air introduction switch 83, an inside air circulation switch 84, set temperature switching dials 85 and 86, and an air-conditioning information display 87.

The A/C switch 80 is a switch by which the occupant selects whether or not the A/C is driven. When the A/C switch 80 is pushed once, the A/C becomes an ON state, and when the A/C switch 80 is pushed again, the A/C becomes an OFF state.

Note that in a state where the A/C switch 80 is set to the ON state, an automatic mode is set as an initial state.

The airflow amount switches 81 and 82 are switches by which the occupant adjusts the airflow amount. When the airflow amount switch 81 is pushed, the airflow amount stepwise becomes higher in accordance with the number of pushes. Conversely, when the airflow amount switch 82 is pushed, the airflow amount stepwise becomes lower in accordance with the number of pushes.

Note that in a case where an operation of the airflow amount switch 81 or 82 is performed after the occupant turns the A/C switch 80 to the ON state, the automatic mode is canceled.

The outside air introduction switch 83 is a switch by which the outside air introduction mode is selected in a case where the occupant pushes the switch. The inside air introduction switch 84 is a switch by which the inside air circulation mode is selected in a case where the occupant pushes the switch. Either one of the outside air introduction switch 83 and the inside air introduction switch 84 is selected by the occupant, and the modes may thereby alternatively be switched.

Note that in a case where an operation of the outside air introduction switch 83 or the inside air introduction switch 84 is performed after the occupant turns the A/C switch 80 to the ON state, the automatic mode is canceled.

The set temperature switching dial 85 is a dial for performing a temperature setting for a right side (on the driver seat side in a case of a right-hand drive vehicle and on a passenger seat side in a case of a left-hand drive vehicle) in the vehicle cabin portion 1b. A set temperature display unit 85a is provided to the set temperature switching dial 85 and displays a present set temperature.

Similarly, the set temperature switching dial 86 is a dial for performing a temperature setting for a left side (on the passenger seat side in a case of a right-hand drive vehicle and on the driver seat side in a case of a left-hand drive vehicle) in the vehicle cabin portion 1b. A set temperature display unit 86a is also provided to the set temperature switching dial 86 and displays a present set temperature.

The air-conditioning information display 87 is arranged between the set temperature switching dial 85 and the set temperature switching dial 86 and displays a state of whether or not the A/C is in the ON state, a state of whether or not the A/C is in the automatic mode, detected temperatures, and the airflow amount of a fan.

Figure 6:
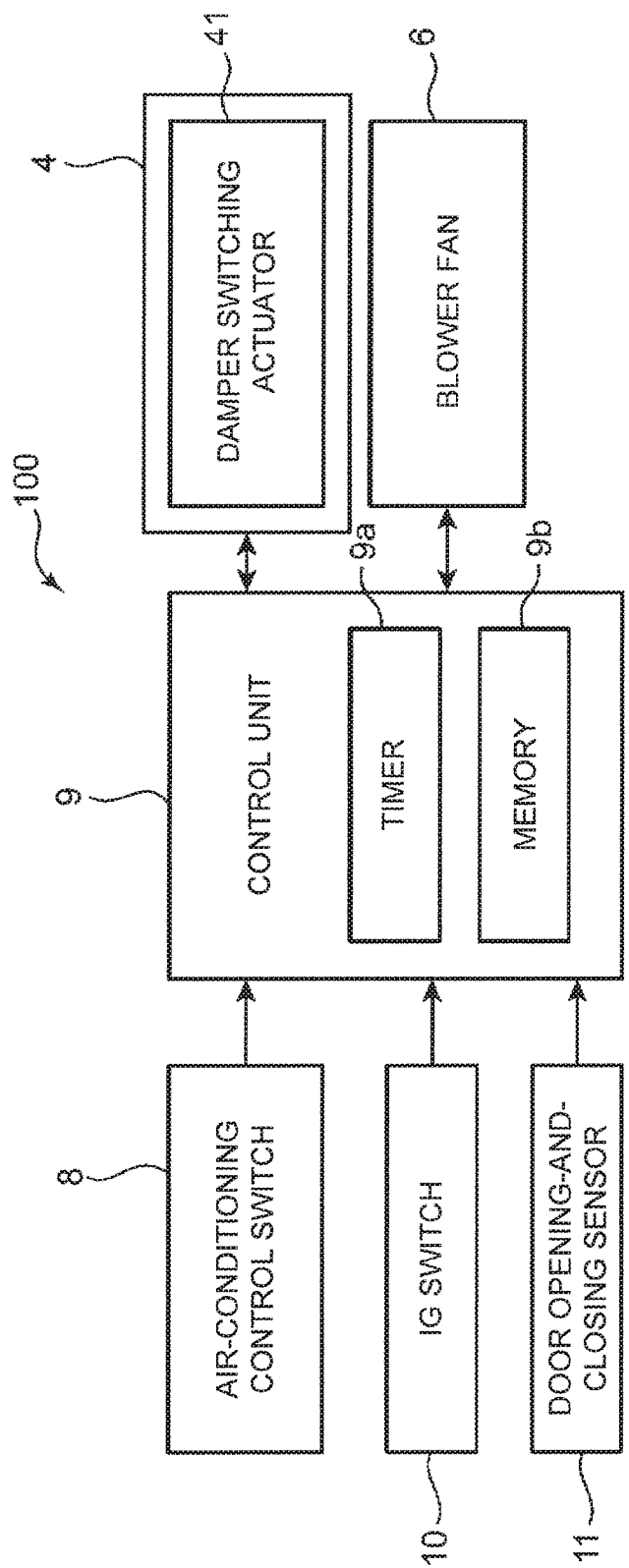
FIG. 6 is a block diagram illustrating a control configuration related to an air-conditioning apparatus for a vehicle.

5. Control Configuration Related to Air-Conditioning Apparatus 100 for Vehicle A description will be made about a control configuration related to an air-conditioning apparatus 100 for a vehicle by using FIG. 6. FIG. 6 is a block diagram illustrating the control configuration related to the air-conditioning apparatus 100 for a vehicle.

As illustrated in FIG. 6, the air-conditioning apparatus 100 for a vehicle according to this embodiment includes a control unit 9, the air-conditioning control switch 8, door opening-and-closing sensors 11, the inside-outside air switching damper 4 including a damper switching actuator 41, the blower fan 6, and an IG (ignition) switch 10 for starting an engine.

The control unit 9 has a microprocessor configured with a CPU, a ROM, a RAM, and so forth. Further, as illustrated in FIG. 6, the control unit 9 includes a timer 9a and a memory 9b.

The timer 9a is a timer in which a time from a start of time measurement (that is, measurement of time) to expiration (that is, a state where time is up or an end) is in advance set to a time Ta. In the air-conditioning apparatus 100 for a vehicle according to this embodiment, the time Ta is set to 30 to 40 sec. (for example, 35 sec.).

Note that the time Ta is a value defined experimentally and empirically.

Referring to FIG. 6 again, to the control unit 9, information from the air-conditioning control switch 8, ON/OFF information from the IG switch 10, information about opening and closing of the doors 2 from the door opening-and-closing sensors 11, and so forth are input. In addition, to the control unit 9, information about a present state (the selected mode) of the inside-outside air switching damper 4 from the damper switching actuator 41 and information about actuation and non-actuation of the blower fan 6 are also input.

Note that as described above, the door opening-and-closing sensor 11 is provided to the support portion of each of the doors 2ar, 2al, 2br, and 2bl and the rear gate 2c.

The control unit 9 executes driving control of the damper switching actuator 41 as needed based on each kind of information input as described above.

Note that the damper switching actuator 41 is not illustrated in FIG. 2 or FIG. 3 but is provided for driving the valve body 40. Further, based on a command from the control unit 9 to the damper switching actuator 41, the inside-outside air switching damper 4 is alternatively switched to any one of the outside air introduction mode, the inside air circulation mode, and the intermediate mode.

6. Air-Conditioning Control Method

Figure 7:
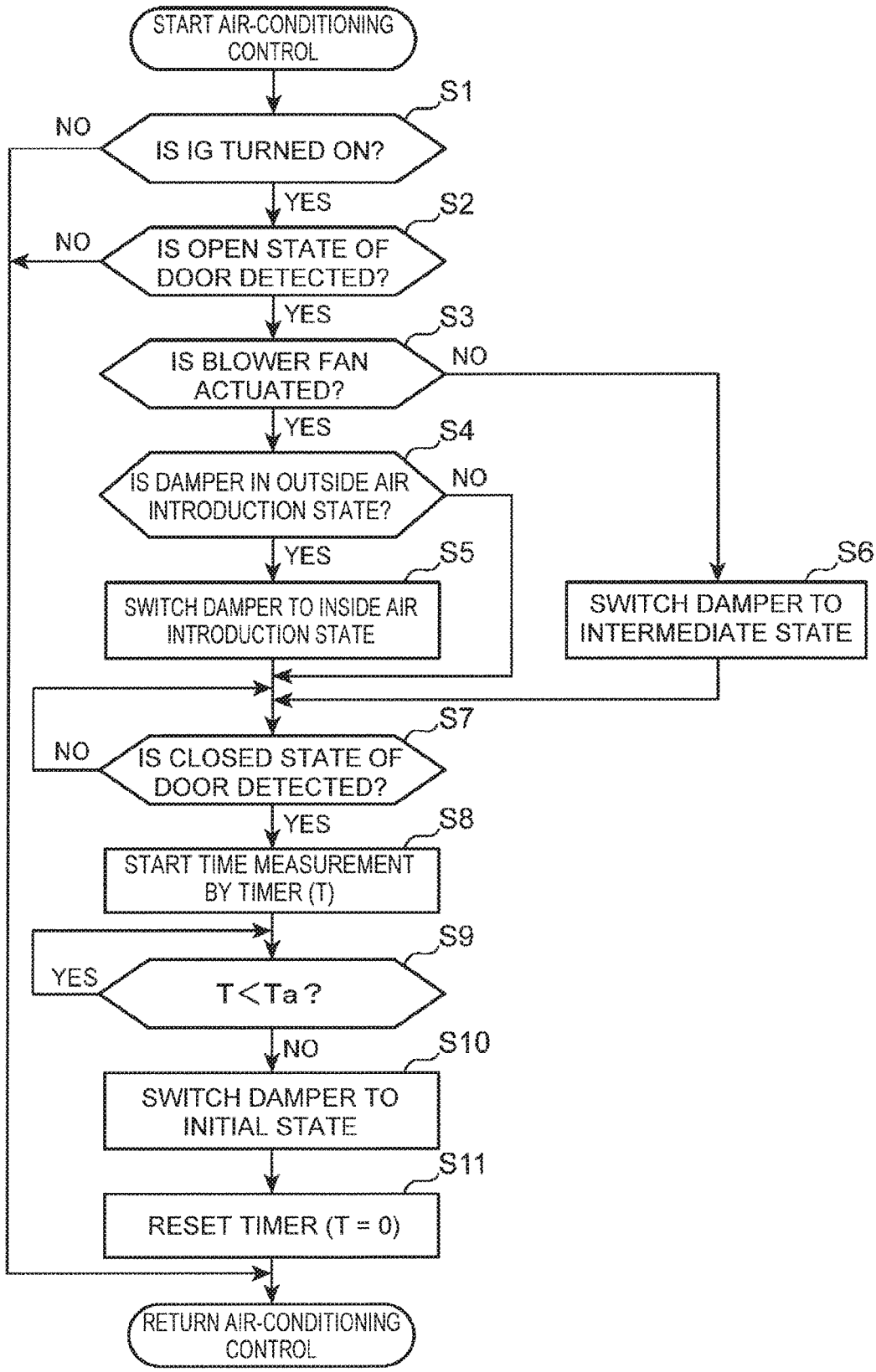
FIG. 7 is a flowchart illustrating an air-conditioning control method executed by a control unit according to the embodiment of the present invention.
Figure 8:
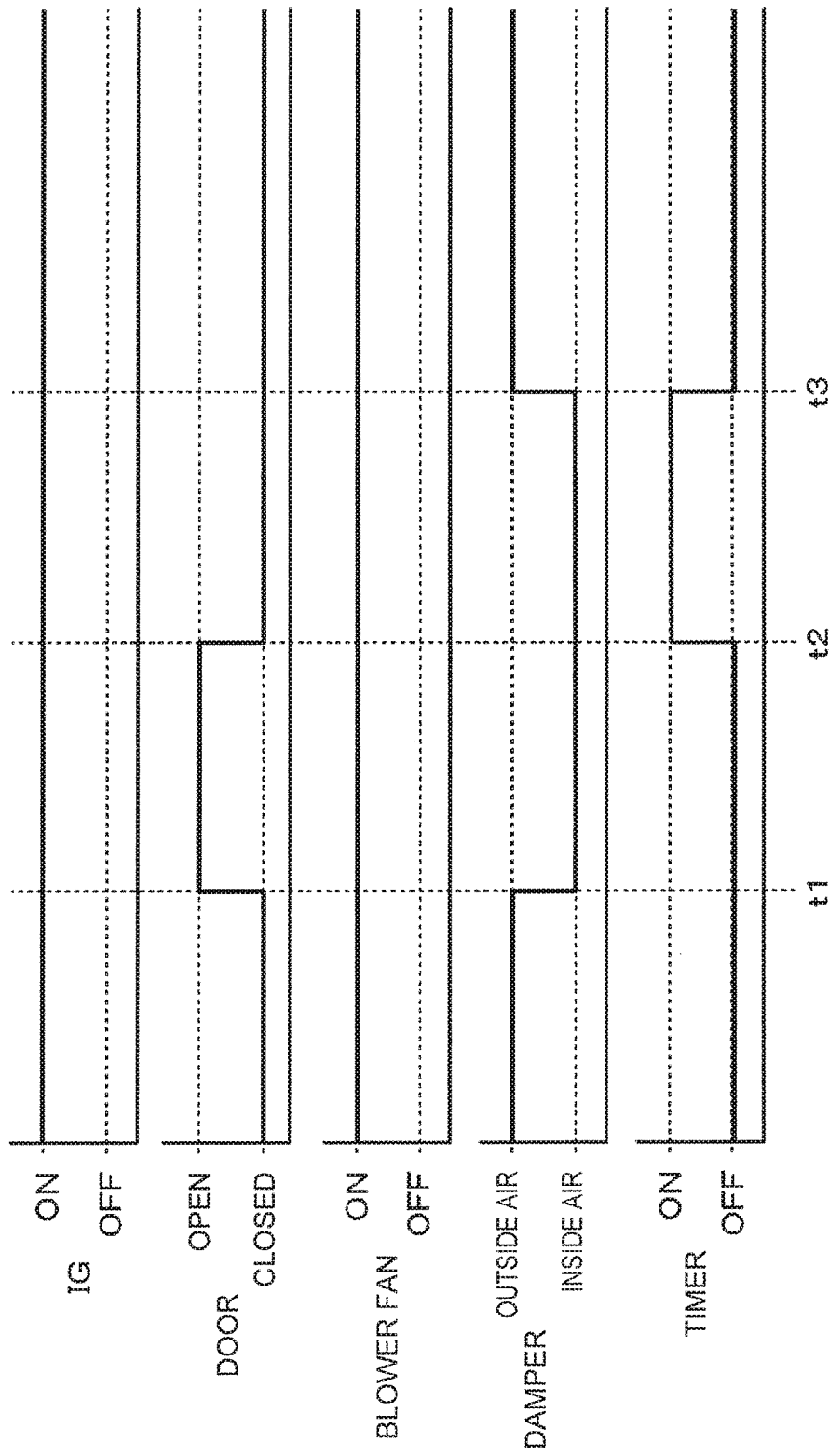
FIG. 8 is a time chart illustrating one example of the air-conditioning control method.

An air-conditioning control method executed by the control unit 9 will be described by using FIG. 7 and FIG. 8. FIG. 7 is a flowchart illustrating the air-conditioning control method executed by the control unit 9, and FIG. 8 is a time chart illustrating one example of the air-conditioning control method.

As illustrated in FIG. 7, in air-conditioning control, the control unit 9 first determines whether or not the IG (ignition) switch 10 is in an ON state (step S1). In a case where it is determined that the IG switch 10 is in an OFF state (step S1: No), the air-conditioning control is returned to a start.

On the other hand, in a case where it is determined that the IG switch 10 is in the ON state (step S1: Yes), the control unit 9 next determines whether or not the door 2 becomes the open state (step S2). Here, in this embodiment, the door 2 to be a target of a determination in step S2 is any one door of the doors 2ar, 2al, 2br, 2bl, and 2c. In a case where all the doors 2 are maintained in a closed state (step S2: No), the air-conditioning control is returned to a start.

On the other hand, in a case where it is determined that one of the doors 2 is opened (step S2: Yes), the control unit 9 next determines whether or not the blower fan 6 is actuated (step S3). In a case where it is determined that the blower fan 6 is actuated (step S3: Yes), the control unit 9 next determines whether or not the inside-outside air switching damper 4 is set to the outside air introduction mode (step S4).

In a case where it is determined that the inside-outside air switching damper 4 is not set to the outside air introduction mode (but is set to the inside air circulation mode) (step S4: No), the control unit 9 stands by until the door 2 is closed (step S7: No).

On the other hand, in a case where it is determined that the inside-outside air switching damper 4 is set to the outside air introduction mode (step S4: Yes), the control unit 9 issues a command to the damper switching actuator 41 to switch the inside-outside air switching damper 4 to the inside air circulation mode (step S5). Then, the control unit 9 executes step S5 and thereafter stands by until the door 2 is closed (step S7: No).

Note that in a case where it is determined that the blower fan 6 is in a non-actuated state in a determination in step S3 (step S3: No), the control unit 9 issues a command to the damper switching actuator 41 to switch the inside-outside air switching damper 4 to the intermediate mode (step S6) and stands by until the door 2 is closed (step S7: No).

Here, although not illustrated in FIG. 7, in execution of step S5 and execution of step S6, the control unit 9 stores the mode of the inside-outside air switching damper 4 immediately previous to the execution, as an initial mode, in the memory 9b.

Next, in a case where the door 2 determined to be opened in the determination in step S2 is closed (step S7: Yes), the control unit 9 starts time measurement by the timer 9a (step S8). The control unit 9 stands by until a counted time T by the timer 9a reaches the set time Ta set in advance (step S9: Yes) and issues a command to the damper switching actuator 41 to switch the inside-outside air switching damper 4 to the mode of an initial state (prior mode) (step S10) at a time point when the counted time T reaches the set time Ta (step S9: No).

Note that "the mode of the initial state (prior mode or default mode)" in the above denotes the mode stored in the memory 9b in execution of step S5 and execution of step S6 as described above. The control unit 9 reads out the mode from the memory 9b and sets the mode as the mode of the initial state in step S10.

Finally, the control unit 9 resets the timer 9a and returns the air-conditioning control.

The air-conditioning control according to this embodiment is finished as described above.

Next, a description will be made about one example of the air-conditioning control described by using the flowchart of FIG. 7 by using FIG. 8. The following example using FIG. 8 is an example of a case where the control unit 9 determines "step S3: Yes" and "step S4: Yes" in the flowchart of FIG. 7.

As illustrated in FIG. 8, in this example, the IG switch 10 is maintained in the ON state. Further, in this example, the blower fan 6 is also maintained in an actuated state.

At a timing t1, the one door of the doors 2 becomes the open state. The control unit 9 determines that the door 2 becomes the open state and then issues a command to the damper switching actuator 41 to switch the inside-outside air switching damper 4 from the outside air introduction mode to the inside air circulation mode.

Next, at a timing t2, in a case where the one door of the doors 2 is closed, the control unit 9 starts the time measurement by the timer 9a (timer turned ON). The control unit 9 waits until the timer 9a expires and then issues a command to the damper switching actuator 41 to switch the mode of the inside-outside air switching damper 4 to the outside air introduction mode as the mode of the initial state at a timing t3.

The control unit 9 finishes the time measurement by the timer 9a at the timing t3 and resets the timer 9a. Accordingly, the air-conditioning control in this example is finished.

Figure 9:
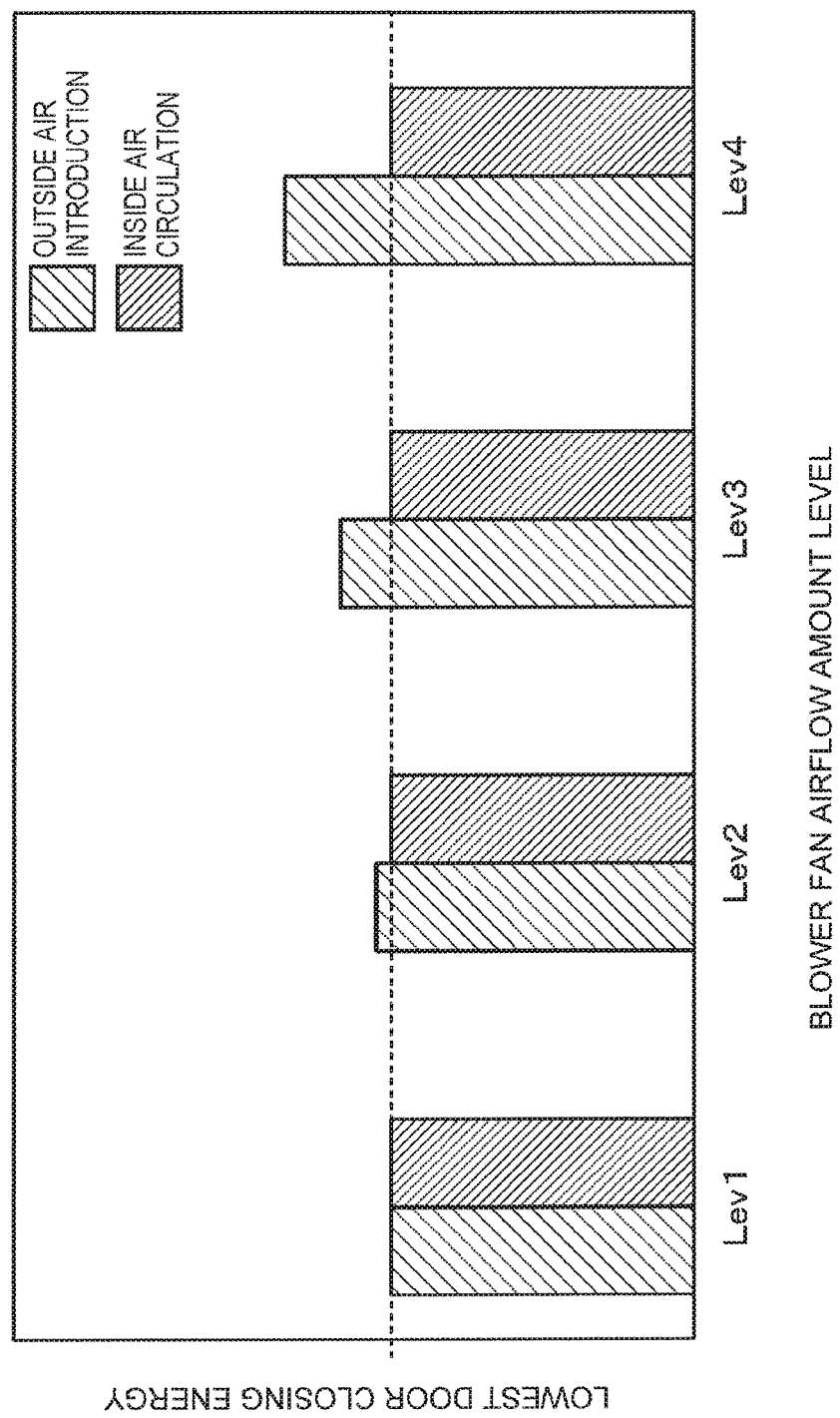
FIG. 9 is a characteristic diagram illustrating the lowest closing energy for a door in each of the outside air introduction mode and the inside air circulation mode.

7. Lowest Door Closing Energy in Each of Outside Air Introduction Mode and Inside Air Circulation Mode A description will be made, by using FIG. 9, about the lowest closing energy for the door 2 in each of the outside air introduction mode and the inside air circulation mode in a case where the blower fan 6 is actuated. FIG. 9 is a characteristic diagram illustrating the lowest closing energy for the door 2 in each of the outside air introduction mode and the inside air circulation mode. Note that FIG. 9 illustrates characteristics in a relative manner while the lowest closing energy for the door 2 in the outside air introduction mode and the inside air circulation mode in a case where the airflow amount of the blower fan 6 is Lev1 is used as a reference.

As illustrated in FIG. 9, in a case where the inside-outside air switching damper 4 is set to the outside air introduction mode, as an airflow amount level of the blower fan 6 becomes higher, the lowest closing energy for the door 2 (the lowest energy necessary for closing the door 2) becomes higher. This indicates that in the outside air introduction mode, as the airflow amount level of the blower fan 6 is higher, an air pressure in the vehicle cabin portion 1b becomes higher and higher energy is needed for closing the door 2.

On the other hand, in a case where the mode of the inside-outside air switching damper 4 is set to the inside air circulation mode, even if the airflow amount level of the blower fan 6 becomes higher from Lev1 to Lev4, the lowest closing energy for the door 2 substantially does not change. This is because in the inside air circulation mode, even in a case where the airflow amount level of the blower fan 6 is high, air only circulates from the inside of the vehicle cabin portion 1b to the inside of the vehicle cabin portion 1b and the air pressure in the vehicle cabin portion 1b hardly rises.

[Modification]

Figure 10:
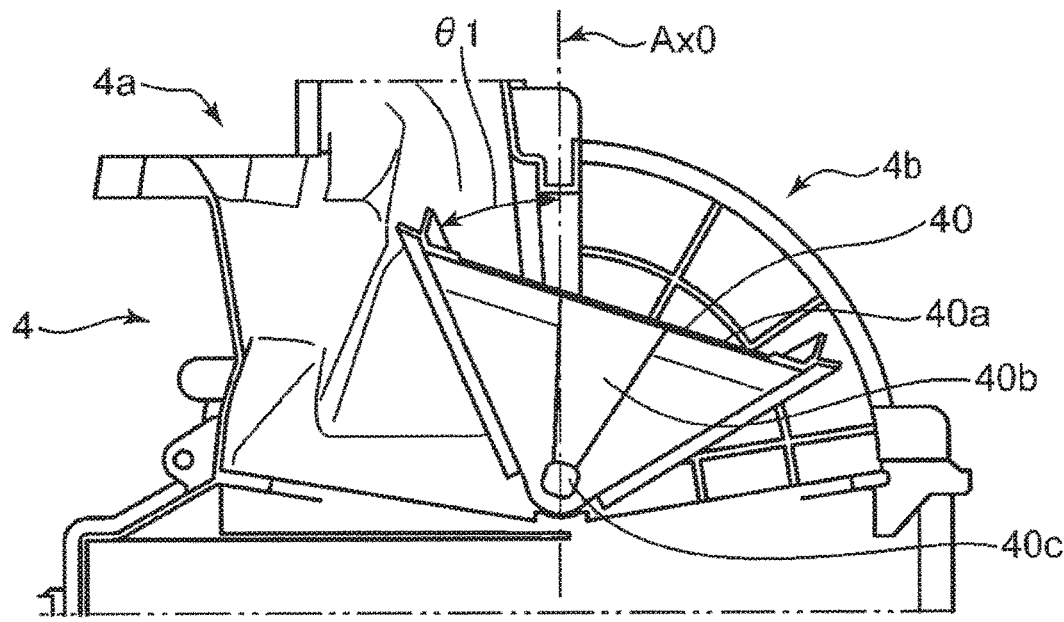
Figure 10:
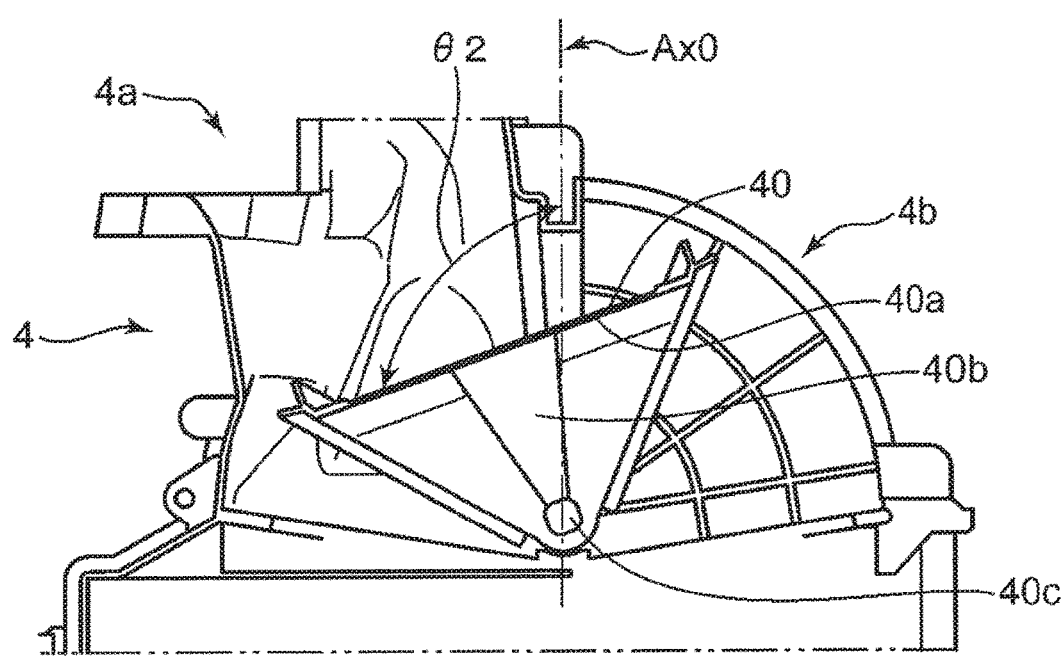

Air-conditioning control according to a modification will be described by using FIG. 10. FIG. 10 is a schematic side view illustrating a state of the inside-outside air switching damper 4 according to this modification. FIG. 10(a) illustrates a state of the inside-outside air switching damper 4 in a second intermediate mode, and FIG. 10(b) illustrates a state of the inside-outside air switching damper 4 in a third intermediate mode.

In the above embodiment, in step S5 in the flowchart of FIG. 7, the inside-outside air switching damper 4 is switched to the outside air introduction mode; however, in this modification, instead of switching to the inside air circulation mode in step S5, the inside-outside air switching damper 4 is switched to the second intermediate mode illustrated in FIG. 10(a) or to the third intermediate mode illustrated in FIG. 10(b). Note that in this modification, the intermediate mode illustrated in FIG. 3(c) is provided as a first intermediate mode.

First, as illustrated in FIG. 10(a), the second intermediate mode according to this modification corresponds to a state where the plate-like body 40a of the valve body 40 is inclined in an oblique direction at an angle θ1 (an angle of less than 90°) with respect to a vertical axis Ax0. That is, when the second intermediate mode illustrated in FIG. 10(a) is compared with the first intermediate mode described by using FIG. 3(c), the second intermediate mode is a mode in which an intake amount of air into the inside-outside air switching damper 4 through the outside air introduction port 4a is larger than an intake amount of air into the inside-outside air switching damper 4 through the inside air introduction port 4b.

Next, as illustrated in FIG. 10(b), the third intermediate mode according to this modification corresponds to a state where the plate-like body 40a of the valve body 40 takes a posture inclined to the opposite side from the second intermediate mode illustrated in FIG. 10(a) and is inclined in an oblique direction at an angle θ2 (an angle of more than 90°) with respect to the vertical axis Ax0. That is, when the third intermediate mode illustrated in FIG. 10(b) is compared with the first intermediate mode and the second intermediate mode, the third intermediate mode is a mode in which the intake amount of air into the inside-outside air switching damper 4 through the outside air introduction port 4a is smaller than the intake amount of air into the inside-outside air switching damper 4 through the inside air introduction port 4b.

An air-conditioning control method according to this modification is characterized in that instead of step S5 in the flowchart illustrated in FIG. 7, the inside-outside air switching damper 4 is switched to any mode of the first intermediate mode, the second intermediate mode, and the third intermediate mode.

The control unit 9 determines which is selected among the first intermediate mode, the second intermediate mode, and the third intermediate mode in step S5 based on a blowing airflow amount of the blower fan 6 as a reference. Specifically, the control unit 9 performs switching to the third intermediate mode illustrated in FIG. 10(b) in a case where the blowing airflow amount of the blower fan 6 is relatively large and performs switching to the first intermediate mode illustrated in FIG. 3(c) or the second intermediate mode illustrated in FIG. 10(a) as the airflow amount becomes smaller.

That is, in the air-conditioning control method according to this modification, in a case where the control unit 9 determines that the door 2 is opened, the inside-outside air switching damper 4 executes the outside air introduction mode, and the blower fan 6 is actuated, the control unit 9 controls the inside-outside air switching damper 4 such that an intake amount of air from the outside of the vehicle cabin is made relatively small as the blowing airflow amount of the blower fan 6 is larger and the intake amount of air from the outside of the vehicle cabin is made relatively large as the blowing airflow amount of the blower fan 6 is smaller.

[Other Modifications]

In the above modification, as described by using FIG. 3(c), FIG. 10(a), and FIG. 10(b), as the intermediate modes, three intermediate modes of the first intermediate mode, the second intermediate mode, and the third intermediate mode are provided. However, in the present invention, a configuration limited to this may be employed, and a configuration including four or more intermediate modes may be employed.

Further, in the above embodiment, a configuration is employed in which mode switching is performed by rotation of the plate-like body 40a in the inside-outside air switching damper 4; however, the present invention is not limited to this. A so-called rotary damper structure may be employed.

Further, in the above embodiment, the control unit 9 includes the timer 9a; however, the present invention is not limited to this. For example, the control unit 9 may perform the time measurement by using a timer provided in an outside portion of the control unit 9. Further, continuous time measurement may be performed by using two timers.

In the above embodiment, as described by using FIG. 9, the airflow amount level of the blower fan 6 has four stages; however, the present invention is not limited to this. Three or less stages are possible, and five or more stages are possible. In addition, the airflow amount level of the blower fan may be not only in a form in which the airflow amount stepwise increases or decreases but also in a form in which the airflow amount continuously increases or decreases (gradually increases or gradually decreases).

CONCLUSION OF EMBODIMENT

The above embodiment will be summarized as follows.

An air-conditioning apparatus for a vehicle according to the above embodiment includes: an inside-outside air switching unit capable of switching between an outside air introduction mode for introducing air from an outside of a vehicle cabin of the vehicle and an inside air circulation mode for causing air in the vehicle cabin of the vehicle to circulate; a blower fan blowing air taken in by the inside-outside air switching unit into the vehicle cabin; a door opening-and-closing detection unit detecting an open-or-closed state of a door of the vehicle; and an air-conditioning controller accepting information about detection from the door opening-and-closing detection unit, information about a mode being executed by the inside-outside air switching unit, and information about whether or not the blower fan is actuated, the air-conditioning controller issuing a command of a mode to be executed to the inside-outside air switching unit, in which the air-conditioning controller issues a command to the inside-outside air switching unit to perform switching to the inside air circulation mode in a case where a determination is made that the door opening-and-closing detection unit detects an open state of the door, the inside-outside air switching unit executes the outside air introduction mode, and the blower fan is actuated.

In the air-conditioning apparatus for a vehicle according to the above aspect, in a case where when the door is opened, the inside-outside air switching unit is in the outside air introduction mode and the blower fan is actuated, the air-conditioning controller switches the mode of the inside-outside air switching unit to the inside air circulation mode. Thus, a pressure in the vehicle cabin is inhibited from becoming high compared to the outside of the vehicle cabin when the door is closed. That is, in the air-conditioning apparatus for a vehicle according to the above aspect, switching to the inside air circulation mode is performed while a state where the blower fan is actuated is maintained based on an instruction of the occupant, the pressure in the vehicle cabin is thereby inhibited from becoming higher than the outside of the vehicle cabin, and a problem with a closing degree in closing the door (occurrence of a door-ajar state) may be inhibited.

Further, because the air-conditioning apparatus for a vehicle according to the above aspect does not stop actuation of the blower fan in opening and closing the door while complying with an intention of the occupant, the occupant does not experience discomfort.

Consequently, the air-conditioning apparatus for a vehicle according to the above aspect may inhibit the closing degree of the door from being insufficient even when the door is closed while the blower fan is actuated.

As for the air-conditioning apparatus for a vehicle according to another aspect of the above embodiment, in the above aspect, in a case where the door opening-and-closing detection unit detects a closed state of the door after the door opening-and-closing detection unit detects the open state of the door, the air-conditioning controller waits until a set time set in advance elapses and issues a command to the inside-outside air switching unit to perform a return to an immediately previous mode to detection of the open state of the door by the door opening-and-closing detection unit.

In the air-conditioning apparatus for a vehicle in the above aspect, when the door is closed, the mode of the inside-outside air switching unit is not immediately returned to the prior mode (the immediately previous mode to opening of the door) but is returned after the set time elapses. Thus, the air-conditioning apparatus for a vehicle has an advantage in terms of not impairing quietness in the vehicle cabin and in terms of inhibiting frequent driving of the inside-outside air switching unit in a case where plural occupants get on and off the vehicle.

Further, in the air-conditioning apparatus for a vehicle according to the above aspect, because the mode of the inside-outside air switching unit is returned to the prior mode after the above set time elapses, the occupant is less likely to experience discomfort, and the occupant may be prevented from feeling troublesomeness due to again setting the mode of the inside-outside air switching unit after the door is closed.

As for the air-conditioning apparatus for a vehicle according to another aspect of the above embodiment, in the above aspect, the inside-outside air switching unit is capable of performing switching to an intermediate mode for causing the outside of the vehicle cabin and an inside of the vehicle cabin of the vehicle to become a communicating state in addition to the outside air introduction mode and the inside air circulation mode, and the air-conditioning controller issues a command to the inside-outside air switching unit to perform switching to the intermediate mode in a case where a determination is made that the door opening-and-closing detection unit detects the open state of the door and the blower fan is not actuated.

In the air-conditioning apparatus for a vehicle according to the above aspect, in a case where the blower fan is not actuated when the door is opened, the inside-outside air switching unit is switched to the intermediate mode. Thus, the inside of the vehicle cabin and the outside of the vehicle cabin become the communicating state through the inside-outside air switching unit when the door is closed, and a problem with the closing degree of the door (occurrence of the door-ajar state) may thereby be inhibited. Thus, the air-conditioning apparatus for a vehicle according to the above aspect may inhibit a problem with the closing degree of the door regardless of actuation and non-actuation of the blower fan.

An air-conditioning apparatus for a vehicle according to one aspect of the above embodiment includes: an inside-outside air switching unit capable of switching among an outside air introduction mode for introducing air from an outside of a vehicle cabin of the vehicle, an inside air circulation mode for causing air in the vehicle cabin of the vehicle to circulate, and an intermediate mode for taking in air from both of the outside of the vehicle cabin and an inside of the vehicle cabin of the vehicle; a blower fan blowing air taken in by the inside-outside air switching unit into the vehicle cabin; a door opening-and-closing detection unit detecting an open-or-closed state of a door of the vehicle; and an air-conditioning controller accepting information about detection from the door opening-and-closing detection unit, information about a mode being executed by the inside-outside air switching unit, information about whether or not the blower fan is actuated, and information about an airflow amount of a blow in a case where the blower fan is actuated, the air-conditioning controller issuing a command of a mode to be executed to the inside-outside air switching unit, in which the air-conditioning controller issues a command to the inside-outside air switching unit to perform switching to the intermediate mode in a case where a determination is made that the door opening-and-closing detection unit detects an open state of the door, the inside-outside air switching unit executes the outside air introduction mode, and the blower fan is actuated and controls the inside-outside air switching unit in the switching to the intermediate mode such that an intake amount of air from the outside of the vehicle cabin is made relatively small as the airflow amount of the blower fan is larger and the intake amount of air from the outside of the vehicle cabin is made relatively large as the airflow amount of the blower fan is smaller.

In the air-conditioning apparatus for a vehicle according to the above aspect, in a case where when the door is opened, the inside-outside air switching unit is in the outside air introduction mode and the blower fan is actuated, the air-conditioning controller switches the mode of the inside-outside air switching unit to the intermediate mode. Thus, the intake amount of air from the outside of the vehicle cabin may be reduced when the door is closed. Thus, the air-conditioning apparatus for a vehicle according to the above aspect also enables the pressure in the vehicle cabin to be reduced compared to a case where the outside air introduction mode is executed. That is, in the air-conditioning apparatus for a vehicle according to the above aspect, switching to the intermediate mode is performed while a state where the blower fan is actuated is maintained based on an instruction of the occupant, reduction in the pressure in the vehicle cabin is thereby intended, and a problem with the closing degree in closing the door (occurrence of the door-ajar state) may be inhibited.

Further, because the air-conditioning apparatus for a vehicle according to the above aspect does not stop actuation of the blower fan in opening and closing the door while complying with the intention of the occupant, the occupant does not experience discomfort.

Further, in the air-conditioning apparatus for a vehicle according to the above aspect, in a case where the door becomes the open state, the inside-outside air switching unit is not switched to the inside air circulation mode but switched to the intermediate mode, and an intake of air from the outside of the vehicle cabin is thereby continued. Thus, the occupant may be made less likely to experience discomfort.

In addition, in the air-conditioning apparatus for a vehicle according to the above aspect, in the switching to the intermediate mode, control is performed such that the intake amount of air from the outside of the vehicle cabin is made relatively small as the airflow amount of the blower fan is larger and the intake amount of air from the outside of the vehicle cabin is made relatively large as the airflow amount of the blower fan is smaller. Thus, a pressure rise in the vehicle cabin in the time from opening to closing of the door may be suppressed to a low level, and this is effective for inhibiting occurrence of the door-ajar state.

Consequently, the air-conditioning apparatus for a vehicle according to the above aspect may inhibit the closing degree of the door from being insufficient even when the door is closed while the blower fan is actuated.

A control method of an air-conditioning apparatus for a vehicle according to one aspect of the above embodiment sets an air-conditioning apparatus as a control target, the air-conditioning apparatus including: an inside-outside air switching unit capable of switching between an outside air introduction mode for introducing air from an outside of a vehicle cabin of the vehicle and an inside air circulation mode for causing air in the vehicle cabin of the vehicle to circulate; a blower fan blowing air taken in by the inside-outside air switching unit into the vehicle cabin; and a door opening-and-closing detection unit detecting an open-or-closed state of a door of the vehicle, the control method including an inside air circulation mode switching step of switching the inside-outside air switching unit to the inside air circulation mode in a case where a determination is made that the door opening-and-closing detection unit detects an open state of the door, the inside-outside air switching unit executes the outside air introduction mode, and the blower fan is actuated.

In the control method of an air-conditioning apparatus for a vehicle according to the above aspect, in a case where when the door is opened, the inside-outside air switching unit is in the outside air introduction mode and the blower fan is actuated, the inside air circulation mode switching step is executed. Thus, the pressure in the vehicle cabin is inhibited from becoming high compared to the outside of the vehicle cabin when the door is closed. That is, in the control method of an air-conditioning apparatus for a vehicle according to the above aspect, switching to the inside air circulation mode is performed while a state where the blower fan is actuated is maintained based on an instruction of the occupant, the pressure in the vehicle cabin is thereby inhibited from becoming higher than the outside of the vehicle cabin, and a problem with the closing degree in closing the door (occurrence of the door-ajar state) may be inhibited.

Further, in the control method of an air-conditioning apparatus for a vehicle according to the above aspect, because actuation of the blower fan is not stopped in opening and closing the door while the intention of the occupant is complied with, the occupant does not experience discomfort.

Consequently, the control method of an air-conditioning apparatus for a vehicle according to the above aspect may inhibit the closing degree of the door from being insufficient even when the door is closed while the blower fan is actuated.

As for the control method of an air-conditioning apparatus for a vehicle according to another aspect of the above embodiment, in the above aspect, the inside-outside air switching unit is capable of performing switching to an intermediate mode for causing the outside of the vehicle cabin and an inside of the vehicle cabin of the vehicle to become a communicating state in addition to the outside air introduction mode and the inside air circulation mode, and the control method further includes an intermediate mode switching step of switching the inside-outside air switching unit to the intermediate mode in a case where a determination is made that the door opening-and-closing detection unit detects the open state of the door and the blower fan is not actuated.

In the control method of an air-conditioning apparatus for a vehicle according to the above aspect, in a case where the blower fan is not actuated when the door is opened, the intermediate mode switching step is executed. Thus, the inside of the vehicle cabin and the outside of the vehicle cabin become the communicating state through the inside-outside air switching unit when the door is closed, and a problem with the closing degree of the door (occurrence of the door-ajar state) may thereby be inhibited. Thus, the control method of an air-conditioning apparatus for a vehicle according to the above aspect may inhibit a problem with the closing degree of the door regardless of actuation and non-actuation of the blower fan.

A control method of an air-conditioning apparatus for a vehicle according to one aspect of the above embodiment sets an air-conditioning apparatus as a control target, the air-conditioning apparatus including: an inside-outside air switching unit capable of switching among an outside air introduction mode for introducing air from an outside of a vehicle cabin of the vehicle, an inside air circulation mode for causing air in the vehicle cabin of the vehicle to circulate, and an intermediate mode for taking in air from both of the outside of the vehicle cabin and an inside of the vehicle cabin of the vehicle; a blower fan blowing air taken in by the inside-outside air switching unit into the vehicle cabin; and a door opening-and-closing detection unit detecting an open-or-closed state of a door of the vehicle, the control method including an intermediate mode switching step of switching the inside-outside air switching unit to the intermediate mode in a case where a determination is made that the door opening-and-closing detection unit detects an open state of the door, the inside-outside air switching unit executes the outside air introduction mode, and the blower fan is actuated, and in which in the intermediate mode switching step, an intake amount of air from the outside of the vehicle cabin is made relatively small as the airflow amount of the blower fan is larger and the intake amount of air from the outside of the vehicle cabin is made relatively large as the airflow amount of the blower fan is smaller.

In the control method of an air-conditioning apparatus for a vehicle according to the above aspect, in a case where when the door is opened, the inside-outside air switching unit is in the outside air introduction mode and the blower fan is actuated, the intermediate mode switching step is executed. Thus, the intake amount of air from the outside of the vehicle cabin may be reduced when the door is closed. Thus, the control method of an air-conditioning apparatus for a vehicle according to the above aspect also enables the pressure in the vehicle cabin to be reduced compared to a case where the outside air introduction mode is executed. That is, in the control method of an air-conditioning apparatus for a vehicle according to the above aspect, the inside-outside air switching unit is switched to the intermediate mode while a state where the blower fan is actuated is maintained based on an instruction of the occupant, reduction in the pressure in the vehicle cabin is thereby intended, and a problem with the closing degree in closing the door (occurrence of the door-ajar state) may be inhibited.

Further, also in the control method of an air-conditioning apparatus for a vehicle according to the above aspect, because actuation of the blower fan is not stopped in opening and closing the door while the intention of the occupant is complied with, the occupant does not experience discomfort.

Further, also in the control method of an air-conditioning apparatus for a vehicle according to the above aspect, in a case where the door becomes the open state, the inside-outside air switching unit is not switched to the inside air circulation mode but switched to the intermediate mode, and an intake of air from the outside of the vehicle cabin is thereby continued. Thus, the occupant may be made less likely to experience discomfort.

In addition, in the control method of an air-conditioning apparatus for a vehicle according to the above aspect, in the intermediate mode switching step, control is performed such that the intake amount of air from the outside of the vehicle cabin is made relatively small as the airflow amount of the blower fan is larger and the intake amount of air from the outside of the vehicle cabin is made relatively large as the airflow amount of the blower fan is smaller. Thus, a pressure rise in the vehicle cabin in the time from opening to closing of the door may be suppressed to a low level, and this is effective for inhibiting occurrence of the door-ajar state.

Consequently, the control method of an air-conditioning apparatus for a vehicle according to the above aspect may inhibit the closing degree of the door from being insufficient even when the door is closed while the blower fan is actuated.

In each of the aspects of the above embodiment, the closing degree of the door may be inhibited from being insufficient even when the door is closed while the blower fan is actuated.

The invention claimed is:

1. An air-conditioning apparatus for a vehicle, comprising:
    an inside-outside air switching damper designed so as to switch between an outside air introduction mode for introducing air from an outside of a vehicle cabin of the vehicle and an inside air circulation mode for causing air in the vehicle cabin of the vehicle to circulate;
    a blower fan blowing air taken in by the inside-outside air switching damper into the vehicle cabin;
    a door opening-and-closing sensor detecting an open state or a closed state of a door of the vehicle; and
    an air-conditioning controller accepting information about detection from the door opening-and-closing sensor, information about a mode being executed by the inside-outside air switching damper, and information about whether or not the blower fan is actuated, the air-conditioning controller issuing a command of a mode to be executed to the inside-outside air switching damper,
    wherein the air-conditioning controller issues a command to the inside-outside air switching damper to perform switching to the inside air circulation mode in a case where a determination is made that the door opening-and-closing sensor detects the open state of the door, the inside-outside air switching damper executes the outside air introduction mode, and the blower fan is actuated.

2. The air-conditioning apparatus for a vehicle according to claim 1, wherein
    in a case where the door opening-and-closing sensor detects the closed state of the door after the door opening-and-closing sensor detects the open state of the door, the air-conditioning controller waits until a set time set in advance elapses and issues a command to the inside-outside air switching damper to perform a return to an immediately previous mode prior to detection of the open state of the door by the door opening-and-closing sensor.

3. The air-conditioning apparatus for a vehicle according to claim 2, wherein
    the inside-outside air switching damper is designed so as to perform switching to an intermediate mode for causing a flow path of air to form between the outside of the vehicle cabin and an inside of the vehicle cabin of the vehicle in addition to the outside air introduction mode and the inside air circulation mode, and
    the air-conditioning controller issues a command to the inside-outside air switching damper to perform switching to the intermediate mode in a case where a determination is made that the door opening-and-closing sensor detects the open state of the door and the blower fan is not actuated.

4. The air-conditioning apparatus for a vehicle according to claim 1, wherein
    the inside-outside air switching damper is designed so as to perform switching to an intermediate mode for causing a flow path of air to form between the outside of the vehicle cabin and an inside of the vehicle cabin of the vehicle in addition to the outside air introduction mode and the inside air circulation mode, and
    the air-conditioning controller issues a command to the inside-outside air switching damper to perform switching to the intermediate mode in a case where a determination is made that the door opening-and-closing sensor detects the open state of the door and the blower fan is not actuated.

5. An air-conditioning apparatus for a vehicle, comprising:
    an inside-outside air switching damper designed so as to switch among an outside air introduction mode for introducing air from an outside of a vehicle cabin of the vehicle, an inside air circulation mode for causing air in the vehicle cabin of the vehicle to circulate, and an intermediate mode for taking in air from both of the outside of the vehicle cabin and an inside of the vehicle cabin of the vehicle;
    a blower fan blowing air taken in by the inside-outside air switching damper into the vehicle cabin;
    a door opening-and-closing sensor detecting an open state or a closed state of a door of the vehicle; and
    an air-conditioning controller accepting information about detection from the door opening-and-closing sensor, information about a mode being executed by the inside-outside air switching damper, information about whether or not the blower fan is actuated, and information about an airflow amount of the air blown into the vehicle cabin by the blower fan in a case where the blower fan is actuated, the air-conditioning controller issuing a command of a mode to be executed to the inside-outside air switching damper,
    wherein the air-conditioning controller issues a command to the inside-outside air switching damper to perform switching to the intermediate mode in a case where a determination is made that the door opening-and-closing sensor detects the open state of the door, the inside-outside air switching damper executes the outside air introduction mode, and the blower fan is actuated and
    the air-conditioning controller controls the inside-outside air switching damper in the switching to the intermediate mode such that either an intake amount of air from the outside of the vehicle cabin via the inside-outside air switching damper to the blower fan is smaller than an airflow amount of the air from the inside of the vehicle cabin circulated by the blower fan, or the intake amount of air from the outside of the vehicle cabin via the inside-outside air switching damper to the blower fan is larger than the airflow amount of the air from the inside of the vehicle cabin circulated by the blower fan.

* * * * *